(12) United States Patent
Lee et al.

(10) Patent No.: US 9,113,417 B2
(45) Date of Patent: Aug. 18, 2015

(54) APPARATUS AND METHOD FOR CONTROLLING POWER FOR V2X COMMUNICATION

(71) Applicant: Hyundai Motor Company, Seoul (KR)

(72) Inventors: Chang Jae Lee, Gyeonggi-do (KR); Myung Seon Heo, Seoul (KR); Young Chul Oh, Gyeonggi-do (KR); Hyoung Geun Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 336 days.

(21) Appl. No.: 13/692,259

(22) Filed: Dec. 3, 2012

(65) Prior Publication Data

US 2013/0329651 A1 Dec. 12, 2013

(30) Foreign Application Priority Data

Jun. 12, 2012 (KR) ........................ 10-2012-0062807

(51) Int. Cl.
| | |
|---|---|
| *H04W 4/00* | (2009.01) |
| *H04W 52/04* | (2009.01) |
| *H04W 52/36* | (2009.01) |
| *H04W 52/20* | (2009.01) |
| *H04W 52/28* | (2009.01) |
| *H04W 52/34* | (2009.01) |

(52) U.S. Cl.
CPC ............ *H04W 52/04* (2013.01); *H04W 52/367* (2013.01); *H04W 52/20* (2013.01); *H04W 52/283* (2013.01); *H04W 52/343* (2013.01)

(58) Field of Classification Search
CPC .................................................. H04W 52/04
USPC ........................................................ 370/329
See application file for complete search history.

(56) References Cited

U.S. PATENT DOCUMENTS

| | | | | |
|---|---|---|---|---|
| 6,760,598 | B1 * | 7/2004 | Kurjenniemi | .................. 455/522 |
| 8,352,111 | B2 * | 1/2013 | Mudalige | .......................... 701/24 |
| 2008/0095163 | A1 * | 4/2008 | Chen et al. | .................... 370/392 |
| 2008/0316052 | A1 * | 12/2008 | Ruffini | ........................... 340/901 |
| 2010/0019964 | A1 * | 1/2010 | Huang et al. | .............. 342/357.06 |
| 2011/0319127 | A1 * | 12/2011 | Yamamoto | .................... 455/522 |
| 2012/0129459 | A1 * | 5/2012 | Hsieh et al. | .................. 455/66.1 |

FOREIGN PATENT DOCUMENTS

| | | | |
|---|---|---|---|
| JP | 2001217774 A | | 8/2001 |
| JP | 2004343467 A | | 12/2004 |

(Continued)

*Primary Examiner* — Guang Li
(74) *Attorney, Agent, or Firm* — Mintz Levin Cohn Ferris Glovsky and Popeo, P.C.; Peter F. Corless

(57) ABSTRACT

A technique for controlling power for V2X communication is provided. The apparatus includes a reception message analysis process configured to analyze headers of reception messages received from communication apparatuses of roadside apparatuses and surrounding vehicles located around a vehicle, a message loss checking process configured to check whether or not loss of the reception messages occurs by counting sequential numbers included in the headers of the reception messages, a density analysis process configured to analyze a density for each of communication apparatuses located in a communication radius of preset transmission power from the vehicle when the message loss checking process determines that the loss of the reception messages occurs, and a transmission power determination process configured to determine transmission power for V2X communication by deducting the preset transmission power in units of reference power according to the density when the density around the vehicle exceeds a reference value.

14 Claims, 8 Drawing Sheets

(56) References Cited

FOREIGN PATENT DOCUMENTS

| | | |
|---|---|---|
| JP | 2010206554 A | 9/2010 |
| KR | 10-2003-0033407 | 5/2003 |
| KR | 10-2004-0054844 | 6/2004 |
| KR | 10-2005-0033171 | 4/2005 |

* cited by examiner

APPARATUS AND METHOD FOR CONTROLLING POWER FOR V2X COMMUNICATION

CROSS-REFERENCES TO RELATED APPLICATIONS

This application claims priority to Korean patent application No. 10-2012-0062807 filed on Jun. 12, 2012, the disclosure of which is hereby incorporated in its entirety by reference.

BACKGROUND OF THE INVENTION

1. Field of the Invention

The present invention relates to an apparatus and a method for controlling power for Vehicle-to-Infrastructure/Vehicle/Nomadic/ and the like (V2X) communication, and more particularly, to an apparatus and a method for controlling transmission power to minimize power loss during communication with communication apparatuses of roadside devices and surrounding vehicles located around a vehicle.

2. Description of the Related Art

In general, V2X (Vehicle-to-Infrastructure/Vehicle/Nomadic/ and the like) refers to any type of communication schemes applicable to vehicles. V2X denotes detailed communication technology for implementing 'Connected Vehicle' or 'Networked Vehicle' which is called as a general term of art. V2X networking is largely classified into three categories, that is, Vehicle to Infrastructure (hereinafter, referred to as V2I) communication, Vehicle to Vehicle (hereinafter, referred to as V2V) communication, and Vehicle to Nomadic devices (hereinafter, referred to as V2N) communication. In recent years, other types of communication categories are expected to be added as well.

Vehicles set a predetermined level of transmission power for communication with surrounding infrastructures or surrounding vehicles and perform communication with communication apparatuses located within communication radius corresponding to the set this transmission power.

Since a V2X system, which is currently being used, limits only maximum power of the transmission power of the vehicle, most of the communication apparatuses tend to set transmission power as much as possible to obtain good communication quality. In this case, the communication apparatuses serves as an interference source, and thus it is often impossible to smoothly perform communication services.

SUMMARY OF THE INVENTION

Various aspects of the present invention have been made in view of the above problems, and provide an apparatus and a method for controlling the power applied to V2X communication, which improve communication performance and reduce communication power consumption to as little as possible by reducing transmission power depending on a density of each of communication apparatuses located around a vehicle and terminate unnecessary communication.

Various aspects of the present invention provide an apparatus and a method for controlling power for V2X communication, which prevent message loss depending upon distance by increasing transmission power depending on a relative distance between communication apparatuses located around the vehicle.

According to an aspect of the present invention, an apparatus for controlling power for V2X communication is provided. The apparatus may include one or more processors configured to execute a plurality of processes. More specifically the apparatus may include a reception message analysis process configured to analyze headers of reception messages received from communication apparatuses of roadside apparatuses and surrounding vehicles located around a vehicle; a message loss checking process configured to check whether or not loss of the reception messages occurs by counting sequential numbers included in the headers of the reception messages; a density analysis process configured to analyze a density for each of communication apparatuses located in a communication radius of preset transmission power from the vehicle when the message loss checking process determines that the loss of the reception messages occurs; and a transmission power determination process configured to determine transmission power for V2X communication by deducting the preset transmission power in units of reference power according to the density when the density around the vehicle exceeds a reference value.

The density analysis process may analyze the density for each of the communication apparatuses based on at least one of a relative distance and a relative speed between the vehicle and each of the communication apparatuses, and a number of the communication apparatuses located in the communication radius.

The transmission power determination process may maintain the transmission power when the transmission power reaches minimum power.

The transmission power determination process may check a relative distance between the vehicle and each of the communication apparatuses when the density around the vehicle is equal to or less than the reference value, increase the preset transmission power in units of reference power until the loss of the transmission power does not occur when the relative distance exceeds the reference value, and maintain the transmission power when the transmission power reaches maximum power.

The apparatus may further include a message control process configured to transmit a transmission message to the communication apparatuses around the vehicle according to the transmission power determined by the transmission power determination process.

According to another aspect of the present invention, a method of controlling power for V2X communication is provided. The method may include: analyzing, by a processor, headers of reception messages received from communication apparatuses of roadside apparatuses and surrounding vehicles located around a vehicle; checking, by the processor, whether or not loss of the reception messages occurs by counting sequential numbers included in the headers of the reception messages; analyzing, by the processor, a density for each of the communication apparatuses located within a communication radius of preset transmission power from the vehicle when it is determined that the loss of the reception messages occurs in the checking the loss of the reception message; and determining, by the processor, transmission power for the V2X communication by deducting the preset transmission power in process of reference power according the density when the density around the vehicle exceeds a reference value.

Analyzing a density may include analyzing the density for each of the communication apparatuses based on at least one of a relative distance and a relative speed between the vehicle and each of the communication apparatuses, and a number of the communication apparatuses located in the communication radius.

Determining transmission power may include determining the transmission power for the V2X communication by deducting the preset transmission power in units of reference power until the transmission power becomes minimum power when the density around the vehicle exceeds the reference value.

Determining transmission power may also include determining the transmission power for the V2X communication by increasing the preset transmission power in units of the reference power until the transmission power becomes maximum power according to a relative distance between the vehicle and each of the communication apparatuses when the density around the vehicle is equal to or less than a reference value.

The method may further include transmitting, by the processor, a transmission message to the communication apparatuses around the vehicle according to the transmission power determined in the determining transmission power.

The method may further include increasing the preset transmission power in units of the reference power until the preset transmission power becomes the maximum power when it is determined that the loss of the reception messages does not occur in the checking the loss of the reception message.

According to the exemplary embodiment of the present invention, it is possible to improve communication performance and reduce communication power consumption by reducing transmission power according to a density between a vehicle and each of the communication apparatuses located around the vehicle and terminate unnecessary communication.

In addition, it is possible to prevent a message loss according to distance and improve communication performance by increasing transmission power according to a relative distance between communication apparatuses located around the vehicle when the message loss occurs in a state in which the density of each of the communication apparatuses located around the vehicle is low.

The apparatuses and methods of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

The above and other features of the present invention will now be described in detail with reference to an exemplary embodiment thereof illustrated the accompanying drawings which are given hereinbelow by way of illustration only, and thus are not limitative of the present invention, and wherein.

DETAILED DESCRIPTION

Figure 1:
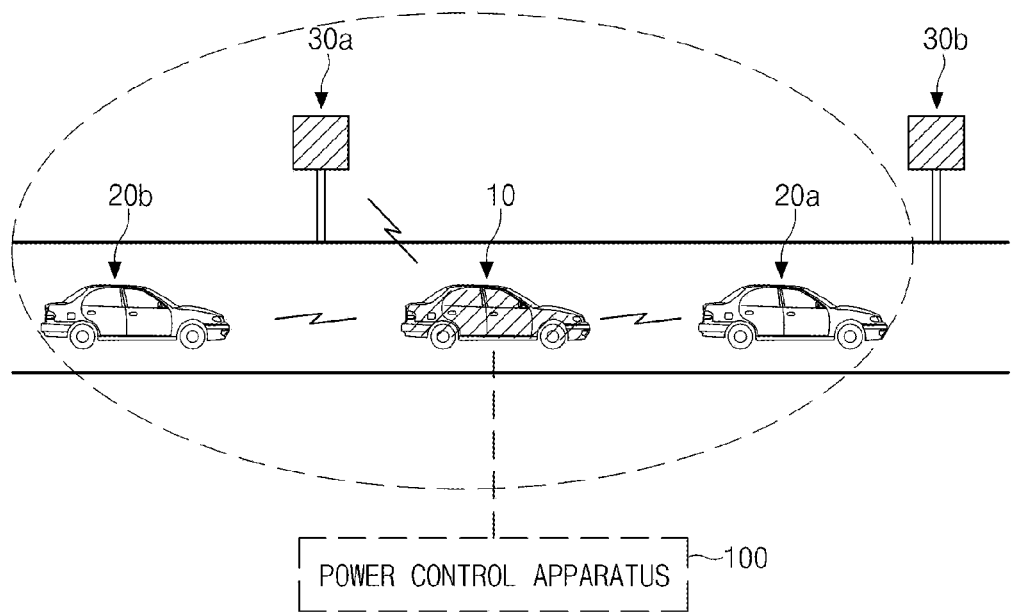
FIG. 1 is a view explaining a configuration of a system to which an apparatus for controlling power for V2X communication is applied according to an exemplary embodiment of the present invention.

Reference will now be made in detail to various embodiments of the present invention(s), examples of which are illustrated in the accompanying drawings and described below. Like reference numerals in the drawings denote like elements. When it is determined that detailed description of a configuration or a function in the related disclosure interrupts understandings of embodiments in description of the embodiments of the invention, the detailed description will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Although exemplary embodiment is described as using a plurality of processes, these processes should be understood as logic or modules that are executed by the processor and may be executed as a single process or a plurality of processes. Additionally, it is understood that the apparatus described herein may be embodied as a controller which refers to a hardware device that includes at least a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a view explaining a configuration of a system to which an apparatus for controlling power for V2X communication is applied according to an exemplary embodiment. Referring to FIG. 1, an apparatus for controlling power for V2X communication (hereinafter, referred to as power control apparatus) 100 controls transmission power according to a density of each of communication apparatuses (e.g., a controller) located within a communication radius in communication between a corresponding vehicle 10 and each of communication apparatuses of surrounding vehicles 20a and 20b and roadside apparatuses 30a and 30b.

In other words, the power control apparatus 100 may transmit messages to a first surrounding vehicle 20a, a second surrounding vehicle 20b, a first roadside apparatus 30a, and a second roadside apparatus 30b located around the relevant vehicle 10. However, the power control apparatus 100 may control the transmission power to exclude the second roadside apparatus 30b, which is farthest from the vehicle 10, from the communication radius.

In this case, the power control apparatus 100 can reduce the transmission power and thus reduce the number of apparatuses located within the communication radius, thereby minimizing signal interference between communication apparatuses. A detailed configuration for the power control apparatus 100 according to an exemplary embodiment will be described with reference to FIG. 2.

Figure 2:
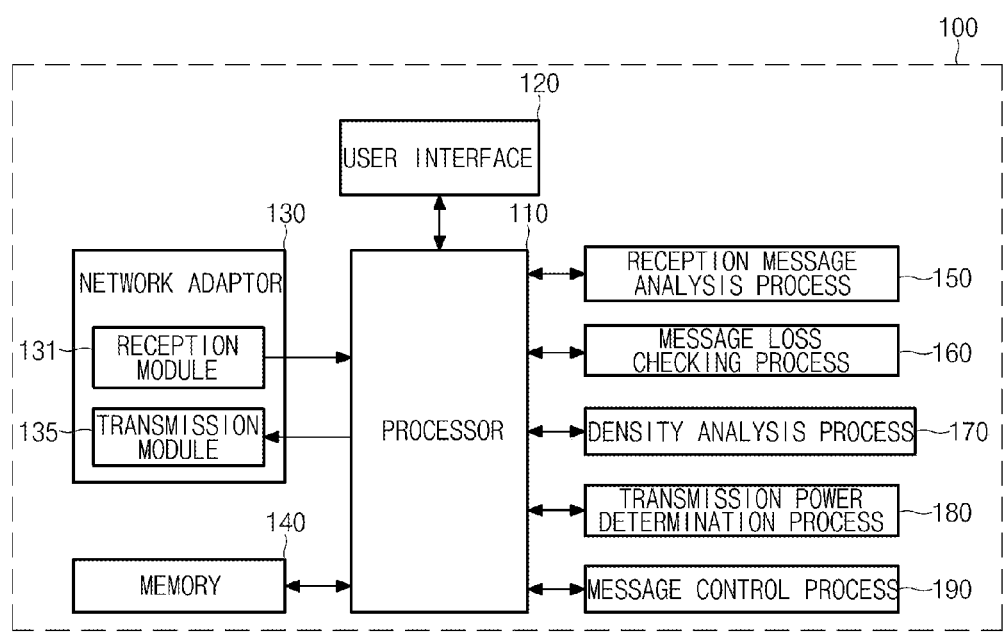
FIG. 2 is a block diagram illustrating a configuration of a power control apparatus for V2X communication according to an exemplary embodiment of the present invention.

FIG. 2 is a block diagram illustrating a configuration of a power control apparatus for V2X communication according to an exemplary embodiment. Referring to FIG. 2, a power control apparatus 100 according to an exemplary embodiment includes a processor 110, a user interface 120, a network adaptor 130, a memory 140, a reception message analysis process 150, a message loss checking process 160, a density analysis process 170, a transmission power determination process 180, and a message control process 190. Here, the processor 110 controls the respective processes or modules of the power control apparatus according to the exemplary embodiment.

The user interface 120 includes an input unit configured to receive a control command from a user and an output unit configured to output an operation state, an operation result, and the like of the power control apparatus. The user interface 120 may be implemented with a touch screen or the like in which the input unit and the output unit are integrated. However, the user interface 120 may be implemented for the input unit and the output unit to be separated as well without departing from the utility of the present invention.

The network adaptor 130 supports communication interface for V2X communication. The network adaptor 130 includes a reception module 131 configured to receive reception messages from communication apparatuses of roadside apparatuses and the surrounding vehicles located around a vehicle, and a transmission module 135 configured to transmit a transmission message to the communication apparatuses.

The memory 140 stores set-up values for operation of the power control apparatus, and further stores state data, result data, and the like according to an operation of the power control apparatus.

The reception message analysis process 150 analyzes the reception messages received from the communication apparatuses of the roadside apparatuses and the surrounding vehicles located around the vehicle. At this time, the reception message analysis process 150 analyzes headers of the reception messages received from the communication apparatuses. More specifically, the reception message analysis process 150 analyzes sequential numbers inserted in message counter fields 'MsgCnt' from the headers of the reception messages. Here, as the sequential numbers inserted in the message counter fields, the same number is not allocated to different messages.

The message loss checking process 160 counts the sequential number included in each of the headers of the reception messages. At this time, the message loss checking process 160 checks loss of the reception message according to whether or not consecutive sequential numbers are received. For example, when the consecutive sequential numbers included in the headers of the reception messages are not received, that is, when number 5 is received after numbers 1, 2 and 3, the message loss checking process 160 determines that the loss of the reception message occurs.

The density analysis process 170 analyzes a density for each of the communication apparatuses of the roadside apparatuses and the surrounding vehicles around the vehicle when the message loss checking process 160 determines that the loss of the reception message occurs. At this time, the density analysis process 170 analyzes the density of each of the communication apparatuses located around the vehicle based on a relative distance and a relative speed between the vehicle and each of the communication apparatuses of the roadside apparatuses and the surrounding vehicles, the number of communication apparatuses located within a communication radius of preset transmission power, and the like.

As one example, when the relative distance between a corresponding vehicle and each of the communication apparatuses of the roadside apparatuses and the surrounding vehicles is within a predetermined distance, the density analysis process 170 determines that the density is high. When the relative speed between a corresponding vehicle and each of the communication apparatuses of the roadside apparatuses and the surrounding vehicles is within a predetermined speed, the density analysis process 170 determines that the density is high. In addition, when the number of the communication apparatuses located within the communication radius of the preset transmission power is larger than a predetermined number, the density analysis process 170 determines that the density is high.

However, the criteria for determining the density of each of the communication apparatuses around the vehicle are not limited thereto. Any condition, which can determine whether the number of the surrounding communication apparatuses is large or small, may be applicable as the criterion for determination of the density.

When the density for each of the communication apparatuses around the vehicle exceeds a reference value from an analysis result from the density analysis process 170, the transmission power determination process 180 reduces the preset transmission power according to the density and determines transmission power for message transmission. At this time, the transmission power determination process 180 determines maximum power within a range in which the message loss does not occur within the communication radius as the transmission power.

Here, the transmission power determination process 180 reduces the preset transmission power in units of reference power according to the density. When the transmission power reaches the minimum power, the transmission power determination process 180 maintains the transmission power to the minimum power without further reduction.

Meantime, when the density is equal to or less than the reference value in the state in which the loss of the reception message has occurred, the power transmission determination process 180 checks the relative distance between the vehicle and each of the communication apparatuses around the vehicle. When the relative distance between the vehicle and each of the communication apparatuses exceeds the reference value, the transmission power determination process 180 determines that the loss of the reception message has occurred due to the communication distance, and increases the transmission power.

At this time, while the transmission power process 180 increases the preset transmission power in units of the reference power according to the relative distance, the transmission power process 180 maintains the transmission power to maximum power without further increase when the transmission power reaches the maxim power. Preferably, the transmission power determination process 180 increases the preset transmission power in units of the reference power until the loss of the reception message does not occur.

The message control process 190 controls the transmission message to be transmitted to the communication apparatuses of the roadside apparatuses and the surrounding vehicles around the vehicle according to the transmission power determined by the transmission power determination process 180.

Figure 3:
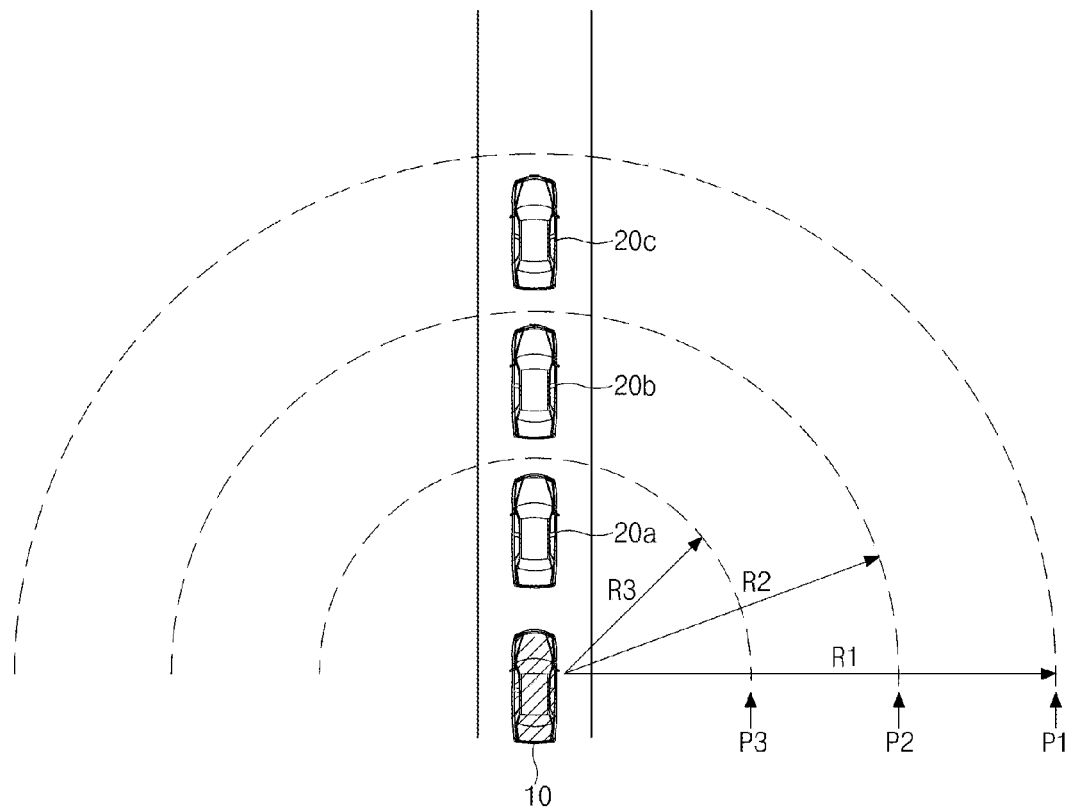
FIG. 3 is an illustrative view illustrating a communication radius according to transmission power of a power control apparatus for V2X communication according to an exemplary embodiment.

FIG. 3 is an illustrative view illustrating a communication radius according to transmission power of a power control apparatus for V2X communication according to an exemplary embodiment. Referring to FIG. 3, the power control apparatus increases or reduces the transmission power to adjust the communication radius. In FIG. 3, P1 refers to maximum transmission power and P3 refers to minimum transmission power. In addition, P2 refers to transmission power which is less the maximum transmission power P1 and greater than the minimum transmission power P3.

When the power control apparatus sets the transmission power to P1, the communication radius becomes R1 to include three surrounding vehicles 20a, 20b, and 20c in front a corresponding vehicle 10. Accordingly, the communication apparatus of the vehicle 10 can communicate with the communication apparatuses of the three surrounding vehicles 20a, 20b, and 20c.

When the loss of the reception message has occurred in a state in which the transmission power has been set to P1, the power control apparatus determines that collision between signals from the communication apparatuses of the surrounding vehicles has occurred, and reduces the transmission power to P2. In this case, the communication radius is changed from R1 to R2 and the third surrounding vehicle 20c in a forward direction of the vehicle is excluded from the communication radius. Accordingly, the communication apparatus of the vehicle can communicate with the communication apparatuses of the two surrounding vehicles 20a and 20b in front of the vehicle 10.

Meantime, when the loss of the reception message has occurred even in the state in which the transmission power has been set to P2, the power control apparatus determines that collision between signals from the communication apparatuses of the surrounding vehicles has occurred, and reduces the transmission power to P3. In this case, the communication radius is changed from R2 to R3 and the second surrounding vehicle 20b in the forward direction of the vehicle 10 is excluded from the communication radius. Accordingly, the communication apparatus of the vehicle can communicate with one surrounding vehicle 20a in front of the vehicle 10.

FIG. 3 has illustrated an example in which the surrounding vehicles arranged is in a row in front of the vehicle to explain the communication radius according to the transmission power. However, it is natural that the density is determined between the vehicle and each of a plurality of surrounding vehicles arranged beside or behind the vehicle in addition to the surrounding vehicles in front of the vehicle.

Figure 4:
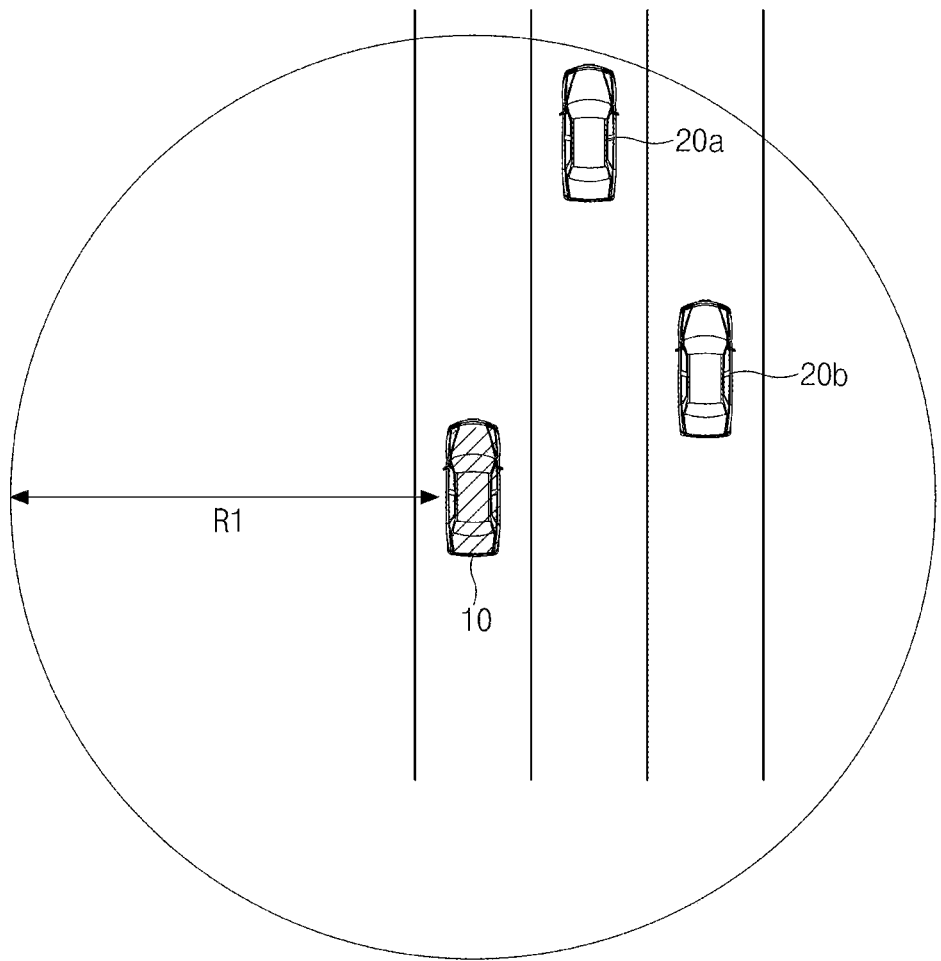
FIGS. 4 and 5 are illustrative views explaining power control operations of a power control apparatus for V2X communication according to a density according to exemplary embodiments of the present invention.
Figure 5:
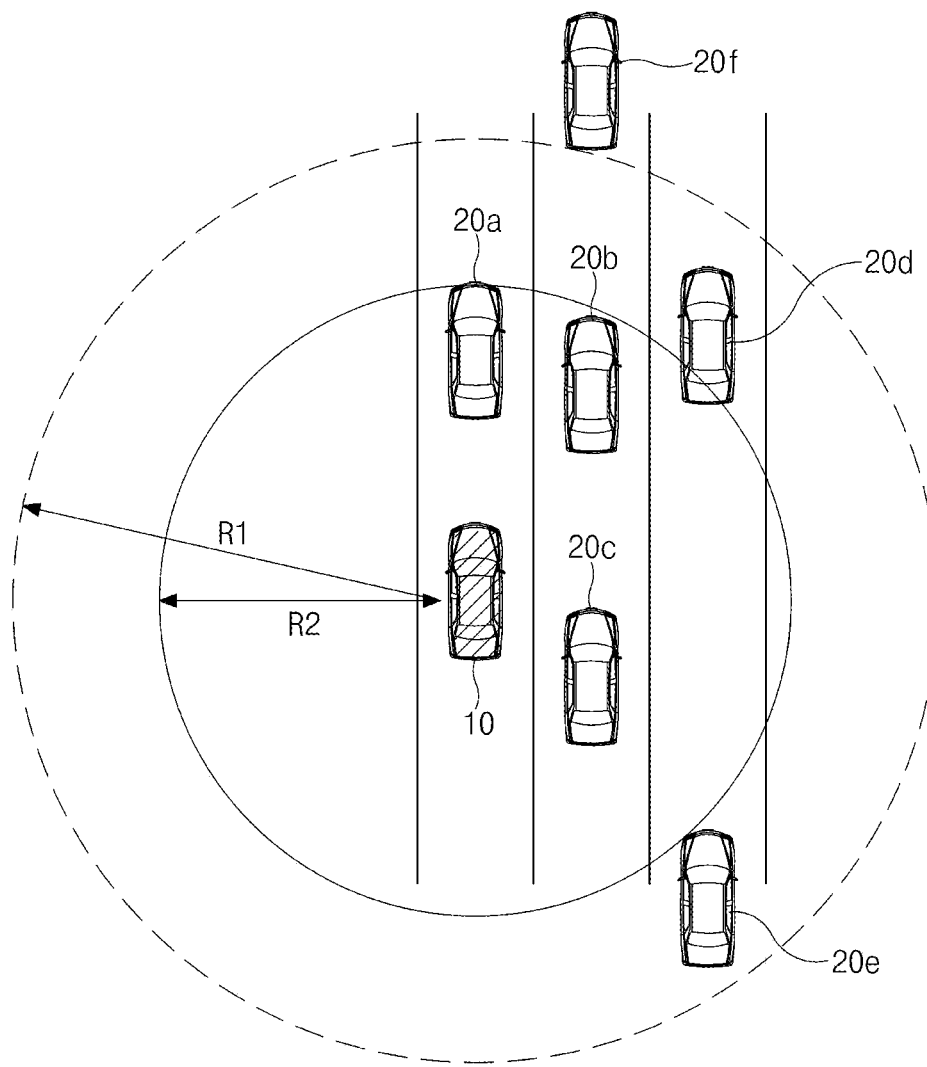

FIGS. 4 and 5 are illustrative views explaining power control operations of a power control apparatus for V2X communication according to a density according to exemplary embodiments. First, FIG. 4 shows a case in which a density for each of communication apparatuses of surrounding vehicles located within the communication radius R1 of preset transmission power is equal to or less than a reference value. In FIG. 4, since the density of each of the communication apparatuses is low, possibility of interference between signals of the communication apparatuses becomes low.

FIG. 5 shows a case in which a density of each of communication apparatuses of surrounding vehicles is increased and thus exceeds a reference value. When the density of each of the communication apparatuses of the surrounding vehicles included within a communication radius exceeds the reference value, possibility of interference between signals of the communication apparatuses becomes high.

When the sequential numbers of the reception messages received from the communication apparatuses of the surrounding vehicles are not consecutive, the power control apparatus determines that loss of the reception messages occurs. At this time, as shown in FIG. 5, when the density of each of the communication apparatus within the communication radius exceeds the reference value, the preset transmission power is reduced by the reference power. Accordingly, the communication radius is changed from R1 to R2.

As shown in FIG. 5, when the communication radius is changed from R1 to R2, the number of the communication apparatuses located within the communication radius is reduced and thus the loss rate of the message is reduced. Accordingly, possibility of interference between signals of the communication apparatuses is lowered.

Although not illustrated in the drawings, as shown in FIG. 4, when the loss of the reception messages occurs in the state in which the density of the communication apparatus within the communication radius is equal to or less than the reference value, the power control apparatus checks the relative distance between the vehicle and each of the communication apparatuses of the surrounding vehicles. From a checking result, when the relative distance exceeds a reference value, the power control apparatus increases the transmission power by the reference power and thus increase the communication radius. Accordingly, the power control apparatus can prevent the loss of the reception message due to the communication distance between the vehicle and each of the communication apparatuses. However, when the preset transmission power is the maximum power, the power control apparatus maintains the preset transmission power.

Hereinafter, operation flow of a power control apparatus for V2X communication according to an exemplary embodiment will be described in more detail.

Figure 6:
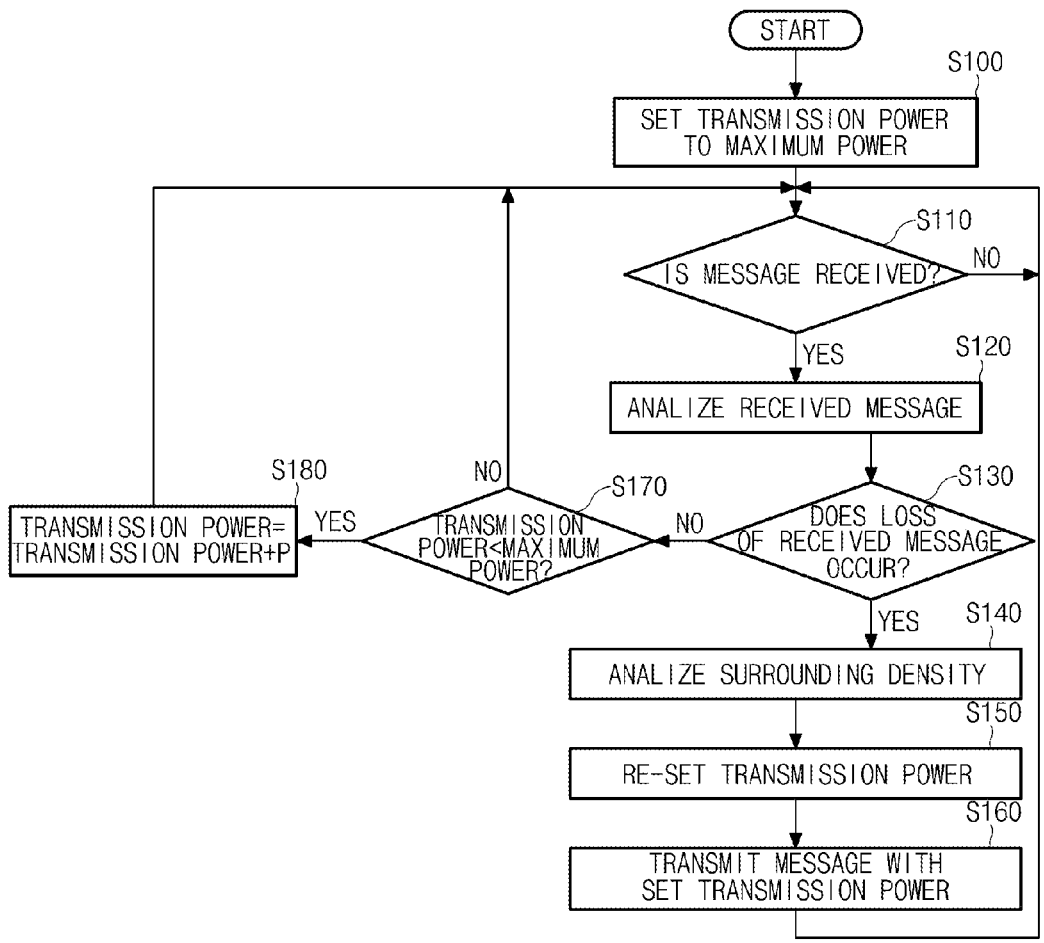
FIG. 6 is a flowchart illustrating operation flow of a method for controlling power for V2X communication according to an exemplary embodiment of the present invention.

FIG. 6 is a flowchart illustrating operation flow of a method of controlling power for V2X communication according to an exemplary embodiment. Referring to FIG. 6, a power control apparatus according to an exemplary embodiment sets transmission power to maximum power in an initial setting step (S100).

Next, when the messages are received from communication apparatuses of the roadside apparatuses and surrounding vehicles around a vehicle (S110), the power control apparatus analyzes the received messages (S120), and checks whether or not loss of the reception messages occurs (S130). In step S120, the power control apparatus analyzes headers of the received messages and checks whether or not the loss of the reception message occurs through sequential numbers in the message counter fields 'MsgCnt' of the headers of the received message. Here, when the sequential numbers in the message counter fields of the reception messages are not consecutive, the power control apparatus determines that the loss of the reception messages occurs.

From an analyzing result of the received messages in step S120, when it is determined that the loss of the reception message has occurred in step S130, the power control apparatus analyzes density for communication apparatuses of roadside apparatuses and surrounding vehicles around the vehicle (S140), and re-sets transmission power (S150). In step S140, the power control apparatus analyzes the density around the vehicle from a relative distance and a relative speed between the vehicle and each of the surrounding communication apparatuses, and the number of the communication apparatuses located within the communication radius from the vehicle.

From analyzing the density in step S140, when it is determined that the density around vehicles is high, the power control apparatus reduces the transmission power, which is set to the maximum power in step S100 and then re-sets the transmission power (S150). At this time, the power control apparatus deducts the preset transmission power by reference power.

The power control apparatus transmits a transmission message by using the transmission power, which is re-set in step S150 (S160). Since the transmission power, which is re-set in step S150 has a communication radius less than that of the transmission power set to the maximum in step S100, the power control apparatus transmits the transmission message to the communication apparatuses located within the communication radius of the re-set transmission power.

Meanwhile, from an analyzing result of the received message in step S120, when it is determined that the loss of the reception messages does not occur in step S130, the power control apparatus checks whether the currently set transmission power is the maximum power (S170). In step S170, when it is determined that the currently set transmission power is the maximum power, the process proceeds step S110. Otherwise, the power control apparatus increases the transmission power by the reference power and re-sets the transmission to the increased transmission power (S180) and then the process proceeds step S110.

Next, the power control apparatus iteratively performs steps S110 to S180, and re-sets the transmission power according to whether or not the loss of the received message occurs.

A detailed operation of the process of step S150 in FIG. 6 will be described with reference to FIGS. 7 and 8.

Figure 7:
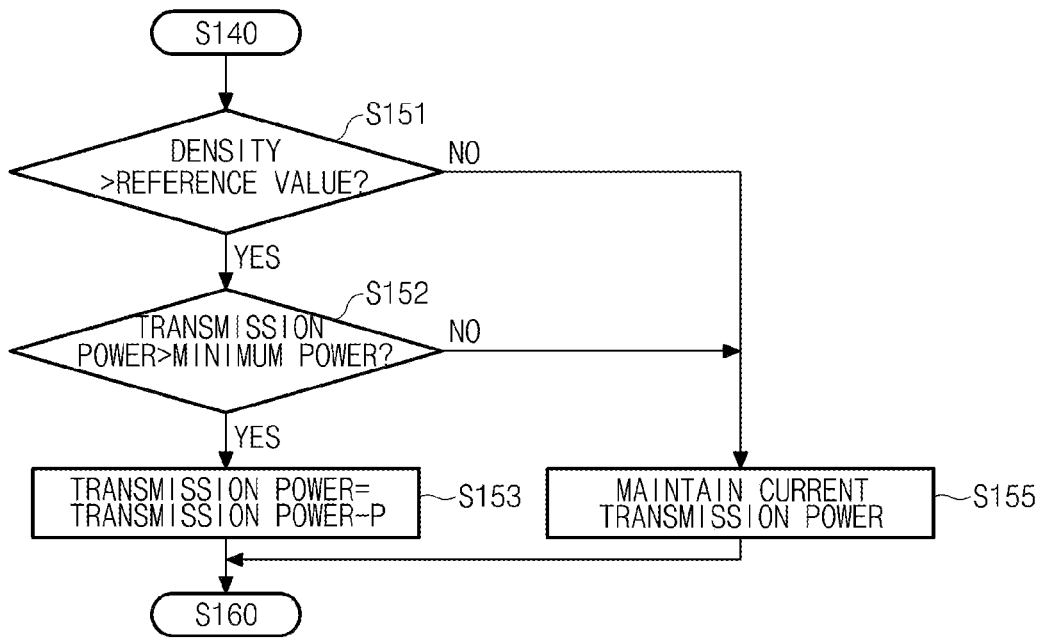
FIG. 7 is a flowchart illustrating detailed operation flow for a process of re-setting transmission power of FIG. 6.

FIG. 7 is a flowchart illustrating detailed operation flow of the re-setting transmission power of FIG. 6. Referring to FIG. 7, the power control apparatus determines whether the density exceeds the reference value from the analyzing result of the density around the vehicle in step S140 of FIG. 6 (S151). When it is determined that the density does not exceed the reference value, the power control apparatus maintains the currently set transmission power (S155).

On the other hand, when it is determined that the density exceeds the reference value, the power control apparatus determines whether the current set transmission power is over the minimum power or not (S152). At this time, when it is determined that the currently set transmission power does not exceed the minimum power in step S152. The power control apparatus maintains the currently set transmission power (S155). Meantime, when it is determined that the currently set transmission power exceeds the minimum power in step S152, the power control apparatus deducts the currently set transmission power by the reference power P and re-sets the deducted transmission power (S153). The power control apparatus transmits the transmission message by using the transmission power determined in step S153 or step S155.

Figure 8:
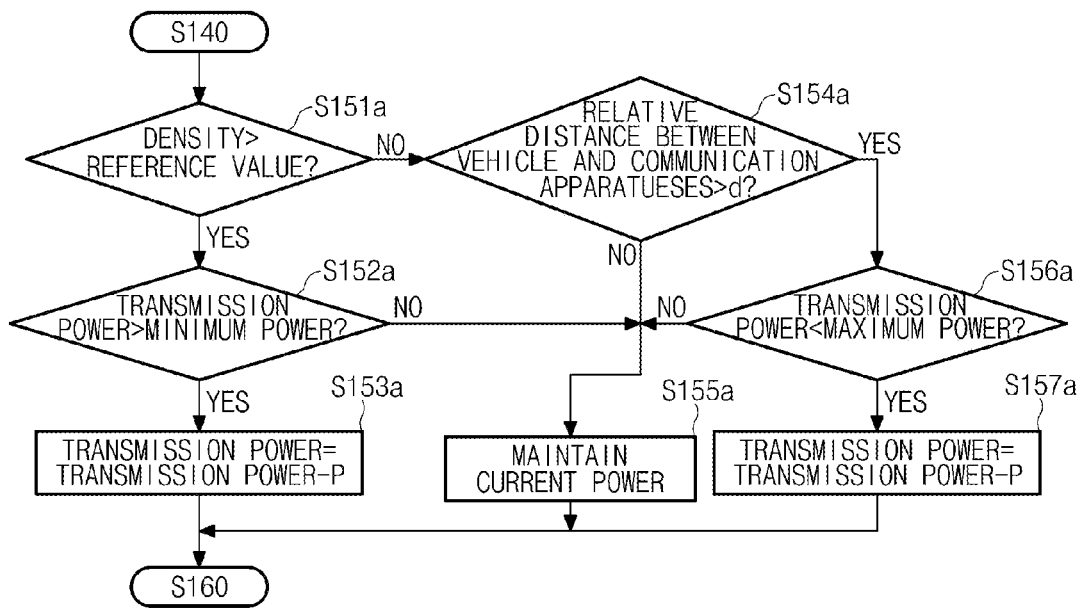
FIG. 8 is a flowchart illustrating detailed operation flow of the re-setting transmission power of FIG. 6 according to another exemplary embodiment of the present invention.

FIG. 8 is flowchart illustrating detailed operation flow of the re-setting transmission power of FIG. 6 according to another exemplary embodiment of FIG. 7. Referring to FIG. 8, from an analyzing result of the density around the vehicle in step S140 of FIG. 6, the power control apparatus determines that whether or not the density exceeds the reference value (S151a). When it is determined that the density exceeds the reference value in step S151a, the power control apparatus checks whether the currently set transmission power exceeds the reference value (S152a).

When it is determined that the currently set transmission power exceeds the minimum power in step S152a, the power control apparatus deducts the currently set transmission power by the reference power P and re-sets the deducted transmission power (S153a). On the other hand, when it is determined that the currently set transmission power does not exceed the minimum power in step S152a, the power control apparatus maintains the currently set transmission power (S155a).

When it is determined that the density does not exceed the reference value in step S151a, the power control apparatus determines whether or not the relative distance between the vehicle and each of the communication apparatuses exceeds a distance reference value d (S154a). When it is determined that the relative distance between the vehicle and each of the communication apparatuses does not exceed the distance reference value d in step S154a, the power control apparatus maintains the currently set transmission power (S155a). When the relative distance between the vehicle and each of the communication apparatuses exceeds the distance reference value d in step S154a, the power control apparatus checks whether or not the currently set transmission power is less than the maximum power (S156a). At this time, when it is determined that the currently set transmission power is not less than the maximum power. The power control apparatus maintains the currently set transmission power (S155a).

On the other hand, when it is determined that the currently set transmission power is less than the maximum power in step S156a, the power control apparatus increases the current set transmission power by the reference power P and re-sets the increased transmission power (S157a). Next, the power control apparatus transmits the transmission message by using the transmission power determined in any one step among steps S153a, 155a, and S157a (S160).

As described above, the apparatus and method for controlling power for V2X communication according to the exemplary embodiment has been illustrated with the drawings, but the present invention is not limited thereto.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling power for vehicle communication, the apparatus comprising:
    a memory;
    a network adaptor configured to communicate with one or more other apparatuses;
    a user interface configured to receive user input; and
    a processor configured to:
        analyze reception messages received from communication apparatuses of roadside apparatuses and surrounding vehicles located around a vehicle, check whether or not loss of the reception messages occurs by counting sequential numbers included in headers of the reception messages, analyze a density for each of communication apparatuses located in a communication radius of preset transmission power from the vehicle when the message loss checking process determines that the loss of the reception messages occurs, determine a transmission power for vehicle communication by deducting the preset transmission power in units of reference power according to the density when the density around the vehicle exceeds a reference value, determine that the loss of the reception messages occurs when the sequential numbers included in the headers of the reception messages are not consecutive, check whether a currently set transmission power is a maximum power and increase the currently set transmission power by the reference power based on a result of the check, when the loss of the reception messages does not occur, and maintain the transmission power when the transmission power reaches minimum power.

2. The apparatus of claim 1, wherein the processor is configured to analyze the density for each of the communication apparatuses based on at least one of a relative distance and a relative speed between the vehicle and each of the communication apparatuses, and a number of the communication apparatuses located in the communication radius.

3. The apparatus of claim 1, wherein the processor is configured to check a relative distance between the vehicle and each of the communication apparatuses when the density around the vehicle is equal to or less than the reference value, increases the preset transmission power in units of reference power when the relative distance exceeds the reference value, and maintains the transmission power when the transmission power reaches maximum power.

4. The apparatus of claim 1, wherein the processor is further configured to transmit a transmission message to the communication apparatuses around the vehicle according to the determined transmission power.

5. A method of controlling power for vehicle communication, the comprising:

analyzing, by a processor, headers of reception messages received from communication apparatuses of roadside apparatuses and surrounding vehicles located around a vehicle;

checking, by the processor, whether or not loss of the reception messages occurs by counting sequential numbers included in the headers of the reception messages;

analyzing, by the processor, a density for each of the communication apparatuses located within a communication radius of preset transmission power from the vehicle when it is determined that the loss of the reception messages occurs in the checking the loss of the reception message;

determining, by the processor, transmission power for the vehicle communication by deducting the preset transmission power in process of reference power according the density when the density around the vehicle exceeds a reference value;

determining that the loss of the reception messages occurs when the sequential numbers included in the headers of the reception messages are consecutive;

checking whether a currently set transmission power is a maximum power and increasing the currently set transmission power by the reference power based on a result of the checking, when the loss of the reception messages does not occur; and maintaining, by the processor, the transmission power when the transmission power reaches minimum power.

6. The method of claim 5, wherein the analyzing a density includes analyzing the density for each of the communication apparatuses based on at least one of a relative distance and a relative speed between the vehicle and each of the communication apparatuses, and a number of the communication apparatuses located in the communication radius.

7. The method of claim 5, wherein the determining transmission power includes determining the transmission power for the vehicle communication by deducting the preset transmission power in units of reference power until the transmission power becomes minimum power when the density around the vehicle exceeds the reference value.

8. The method of claim 5, wherein the determining transmission power includes determining the transmission power for vehicle communication by checking a relative distance between the vehicle and each of the communication apparatuses when the density around the vehicle is equal to or less than a reference value, increasing the preset transmission power in units of the reference power when the relative distance exceed a reference value, and maintaining the transmission power when the transmission power becomes maximum power.

9. The method of claim 5, further comprising transmitting a transmission message to the communication apparatuses around the vehicle according to the transmission power determined in the determining transmission power.

10. The method of claim 5, further comprising increasing the preset transmission power in units of the reference power until the preset transmission power becomes the maximum power when it is determined that the loss of the reception messages does not occur in the checking the loss of the reception message.

11. A non-transitory computer readable medium containing program instructions executed by a processor, the computer readable medium comprising:

program instructions that analyze reception messages received from communication apparatuses of roadside apparatuses and surrounding vehicles located around a vehicle, program instructions that check whether or not loss of the reception messages occurs by counting sequential numbers included in headers of the reception messages, program instructions that analyze a density for each of communication apparatuses located in a communication radius of preset transmission power from the vehicle when the message loss checking process determines that the loss of the reception messages occurs, program instructions that determine a transmission power for vehicle communication by deducting the preset transmission power in units of reference power according to the density when the density around the vehicle exceeds a reference value, program instructions that determine that the loss of the reception messages occurs when the sequential numbers included in the headers of the reception messages are not consecutive, program instructions that check whether a currently set transmission power is a maximum power and increase the currently set transmission power by the reference power based on a result of the check, when the loss of the reception messages does not occur, and program instructions that maintain the transmission power when the transmission power reaches minimum power.

12. The non-transitory computer readable medium of claim 11, further comprising program instructions that analyze the density for each of the communication apparatuses based on at least one of a relative distance and a relative speed between the vehicle and each of the communication apparatuses, and a number of the communication apparatuses located in the communication radius.

13. The non-transitory computer readable medium of claim 11, further comprising program instructions that check a relative distance between the vehicle and each of the communication apparatuses when the density around the vehicle is equal to or less than the reference value, increases the preset transmission power in units of reference power when the relative distance exceeds the reference value, and maintains the transmission power when the transmission power reaches maximum power.

14. The non-transitory computer readable medium of claim 11, further comprising program instructions that transmit a transmission message to the communication apparatuses around the vehicle according to the determined transmission power.

* * * * *